United States Patent
Sebastiani et al.

(10) Patent No.: US 7,014,176 B2
(45) Date of Patent: Mar. 21, 2006

(54) FLUID DISTRIBUTION SYSTEM AND ASSOCIATED METHODS

(75) Inventors: Charles Salvatore Sebastiani, Havertown, PA (US); Charles William Kerr, Morrisville, PA (US); R. Lee Roberts, Chadds Ford, PA (US)

(73) Assignee: RF Delaware, Inc., Wilmington, DE (US)

(*) Notice: Subject to any disclaimer, the term of this patent is extended or adjusted under 35 U.S.C. 154(b) by 0 days.

(21) Appl. No.: 10/412,284

(22) Filed: Apr. 14, 2003

(65) Prior Publication Data

US 2004/0201115 A1 Oct. 14, 2004

(51) Int. Cl.
*B01F 3/04* (2006.01)

(52) U.S. Cl. .................................. 261/122.1; 261/124
(58) Field of Classification Search ............ 261/122.1, 261/122.2, 124, DIG. 47
See application file for complete search history.

(56) References Cited

U.S. PATENT DOCUMENTS

| | | | |
|---|---|---|---|
| 650,671 A | 5/1900 | Deutsch | 210/274 |
| 1,096,868 A | 5/1914 | Stevenson | 210/274 |
| 1,114,763 A | 10/1914 | Hodkinson | 210/274 |
| 3,841,997 A * | 10/1974 | McGee | 210/622 |
| 4,192,255 A * | 3/1980 | Willinger | 119/263 |
| 4,273,732 A | 6/1981 | Roediger | 261/122.1 |
| 4,294,696 A | 10/1981 | Thayer | 210/220 |
| 4,960,546 A * | 10/1990 | Tharp | 261/122.1 |
| 5,013,493 A * | 5/1991 | Tharp | 261/122.2 |
| 5,534,202 A | 7/1996 | Roberts et al. | 261/122.1 |
| 5,587,114 A * | 12/1996 | Tharp | 261/124 |
| 5,673,481 A | 10/1997 | Roberts et al. | 29/890.14 |
| 6,497,402 B1 * | 12/2002 | Tharp | 261/122.1 |
| 6,543,753 B1 * | 4/2003 | Tharp | 261/122.2 |

FOREIGN PATENT DOCUMENTS

| | | |
|---|---|---|
| DE | 1536900 | 3/1972 |
| FR | 1437650 | 3/1966 |

OTHER PUBLICATIONS

Roberts Water Technologies, Technical Standard, Revised Mar. 2, 2000, pp. 3 of 10 to 6 of 10.

* cited by examiner

*Primary Examiner*—Richard L. Chiesa
(74) *Attorney, Agent, or Firm*—Merek, Blackmon & Voorhees, LLC (57) ABSTRACT

A fluid grid system for use with filter systems and other fluid handling devices. Preferably, the fluid grid system is designed such that components thereof may be readily connected to each other without the use of clips or other fasteners. Further, the fluid grid system preferably allows components to be installed and held in place or removed merely by applying a sufficient force to a portion of the component.

12 Claims, 7 Drawing Sheets

FLUID DISTRIBUTION SYSTEM AND ASSOCIATED METHODS

FIELD OF THE INVENTION

The present invention is directed to significant improvements in fluid distribution systems, components thereof and associated methods. The fluid distribution system of the present invention may be used in a filter system to enhance cleaning of a filter bed. However, it must be noted that the fluid distribution system of the present invention is not limited to use with filter systems but rather can be used in any other environment where it is desirable to do so.

BACKGROUND OF THE INVENTION

Various fluid distribution systems have been developed for use with filter systems that filter water and wastewater. The fluid distribution systems act to direct influent and effluent during the filtration stage as desired. The fluid distribution systems also direct washing fluid during backwashing or cleaning of the filter bed or filter beds of the filter system. The fluid typically includes air and water. Separate distribution systems may be provided to direct water and air. Further, the water may be filtered or unfiltered water. Air is typically used to enhance the cleaning process. The air is employed to agitate the bed to allow floc or impurities to become dislodged from the media so that they can be carried away to waste by the washing liquid.

Figure 1:
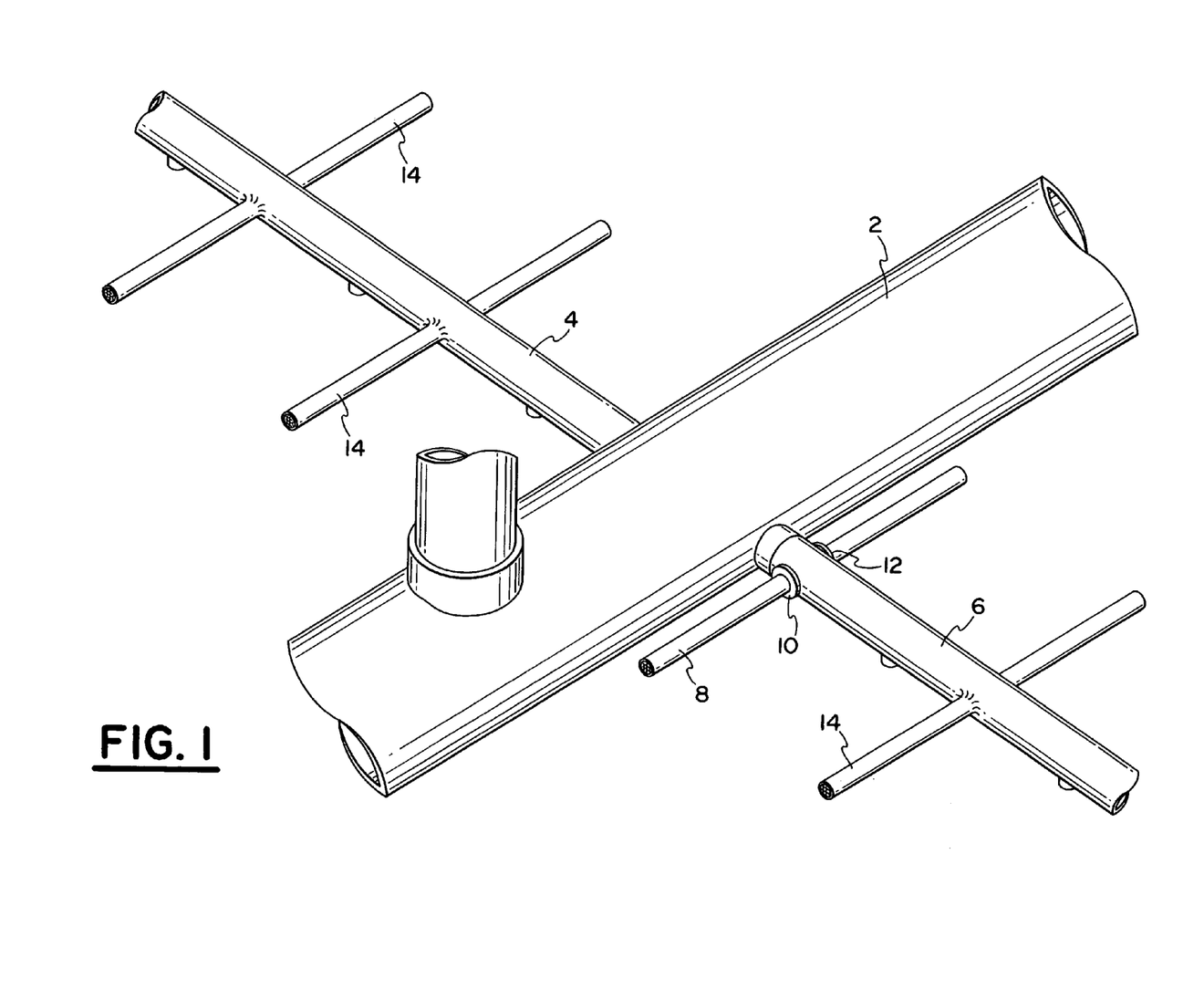
FIG. 1 is a fragmentary perspective view of a fluid grid system depicted substantially as previously known. However, it must be noted that the diffuser conduit 8 of the prior known fluid grid system included grooves (not shown) extending along the longitudinal axis to receive a portion (not shown) of E-clips 10 and 12.

One well known fluid distribution system is the ARIES® air scour system manufactured by a related company to the assignee of the subject patent application. U.S. Pat. Nos. 5,534,202 and 5,673,481 were issued on this air scour system. One commercial embodiment of the ARIES® air scour system is depicted in FIG. 1. The subject invention is a further improvement over the ARIES® air scour system depicted in FIG. 1.

Referring to FIG. 1, a portion of a fluid distribution system is illustrated. The fluid distribution system includes a main header 2 with a pair of laterals 4 and 6 extending outwardly therefrom. Extending from each of the laterals 4 and 6 are a plurality of air diffuser conduits. Air diffuser conduit 8 along with E-clips 10 and 12 removably secure lateral 6 to header 2. Specifically, lateral 6 is mounted on a sleeve (not shown) extending outwardly from header 2. Openings (not shown) are formed on opposite sides of the sleeve and lateral 6. Air diffuser conduit 8 is directed through these openings to assume the position depicted in FIG. 1. E-clips 10 and 12 are then used to secure lateral 6 to header 2. It should be noted that grooves (not shown) extend along the longitudinal axis of diffuser conduit 8. A portion (not shown) of E-clips 10 and 12 engage the grooves to securely attach the lateral 6 to the header 2. Lateral 4 is secured to header 2 in a similar fashion.

To remove the lateral 6 from the header 2, it is necessary to remove both of the E-clips 10 and 12 and then remove the diffuser conduit 8. After these steps are performed, the lateral 6 is free to be removed from the header 2.

E-clips 10 and 12 are subject to corrosion unless made from an expensive material such as stainless steel. Also, the E-clips require that the air diffuser 8 have a special groove formed therein to accommodate these clips. Further, the E-clips and associated air diffuser 8, by their very existence, form crevices in which unwanted microbial organisms can become lodged and grow. Such is undesirable as it can lead to unsatisfactory results in filtering water or other liquids.

The remaining diffuser conduits 14 are permanently secured to the laterals 4 and 6 by welding. This is typically done at the factory and the laterals 4 and 6 are shipped to the installation site with the diffuser conduits 14 already permanently affixed thereto. Hence, if any diffuser conduit 14 is damaged during shipping or becomes clogged during use or otherwise fails to perform in a satisfactory manner it cannot be replaced without replacing the entire lateral. Such is undesirable. In addition, the welding process is time consuming and labor intensive.

Diffuser conduits 14 are not interchangeable with diffuser conduits 8 due to the grooves formed along the longitudinal axis of diffuser conduit 8 to accommodate E-clips 10 and 12. This is undesirable because it requires the manufacturer to create two different parts to perform essentially the same function, i.e., enhance distribution of a fluid through a filter bed or other structure.

Accordingly, a fluid distribution system that overcomes the disadvantages of the prior art fluid distribution systems is desirable.

OBJECTS AND SUMMARY OF THE INVENTION

An object of the present invention is to provide a novel and unobvious fluid distribution system.

Another object of a preferred embodiment of the present invention is to provide a fluid distribution system that can be readily and relatively inexpensively manufactured.

A further object of a preferred embodiment of the present invention is to provide a fluid distribution system that can be readily assembled by relatively unskilled laborers.

Yet another object of a preferred embodiment of the present invention is to provide a fluid distribution system having components that can be readily replaced if defective or inoperative for any reason.

Still another object of a preferred embodiment of the present invention is to provide a fluid distribution system having a minimal number of different parts.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a fluid grid system for distributing fluid through a filter bed. The fluid grid system includes at least one header and at least one lateral. The lateral is connected to the header such that at least a portion of fluid passing through the header is directed to the lateral. At least one fluid diffuser conduit is provided for distributing fluid through a filter bed. The fluid diffuser conduit is connected to the lateral such that at least a portion of fluid passing through the lateral is directed to the fluid diffuser conduit. A connecting section removably connects the fluid diffuser conduit to the lateral without using a clip.

Another embodiment of the present invention is directed to a fluid grid system for distributing fluid through a filter bed. The fluid grid system includes a header and a lateral. The lateral is connected to the header such that at least a portion of fluid passing through the header is directed to the lateral. At least one fluid diffuser conduit is provided for distributing fluid through a filter bed. The fluid diffuser conduit is connected to the lateral such that at least a portion of fluid passing through the lateral is directed to the fluid diffuser conduit. The fluid diffuser conduit includes a connecting section for removably connecting the fluid diffuser conduit to the lateral without using a clip.

A further embodiment of the present invention is directed to a fluid grid system for distributing fluid through a filter bed. The fluid grid system includes a header and a lateral. The lateral is connected to the header such that at least a portion of fluid passing through the header is directed to the lateral. First and second fluid diffuser conduits are provided for distributing a fluid through a filter bed. The first and second fluid diffuser conduits are connected to the lateral such that at least a portion of a fluid passing through the lateral is directed to the first and second fluid diffuser conduits. First and second connecting sections removably connect the first and second fluid diffuser conduits to the lateral.

Still another embodiment of the present invention is directed to a fluid diffuser conduit for distributing fluid in a filter bed. The fluid diffuser conduit includes a first end, a second end, an outer surface and an inner surface. At least one of the first and second ends includes an opening formed therein to permit fluid to flow therethrough. At least a portion of the outer surface of the fluid conduit is knurled to permit the fluid diffuser conduit to be removably attached to another member of a fluid grid system.

Yet another embodiment of the present invention is directed to a method of assembling a fluid grid system for distributing fluid. The method includes the step of providing at least one header and at least one lateral. The method also includes the steps of providing at least one fluid diffuser conduit and removably connecting the fluid diffuser conduit to the lateral such that the fluid diffuser conduit can be removed from the lateral solely by applying a force to a portion of the fluid diffuser conduit.

Still a further embodiment of the present invention is directed to a filter system including a filter bed and a fluid grid system. The fluid grid system is operably associated with the filter bed such that fluid passing through the fluid grid system is directed through the filter bed. The fluid grid system includes at least one header, at least one lateral and at least one fluid diffuser conduit. The header is connected to the lateral such that at least a portion of a fluid passing through the header is directed to the lateral. The fluid diffuser conduit is connected to the lateral such that at least a portion of a fluid passing through the lateral is directed to the fluid diffuser conduit. A connecting section connects the fluid diffuser conduit to the lateral such that said fluid diffuser conduit can be removed from the lateral solely by applying a force to a portion of the fluid diffuser conduit.

DETAILED DESCRIPTION OF THE PREFERRED EMBODIMENT OF THE INVENTION

The preferred form of the invention will now be described with reference to FIGS. 2–8. The appended claims are not limited to the preferred form and no term used herein is to be given a meaning other than its ordinary meaning unless it is expressly stated that the term shall have a special meaning.

FIGS. 2 Through 8

Figure 2:
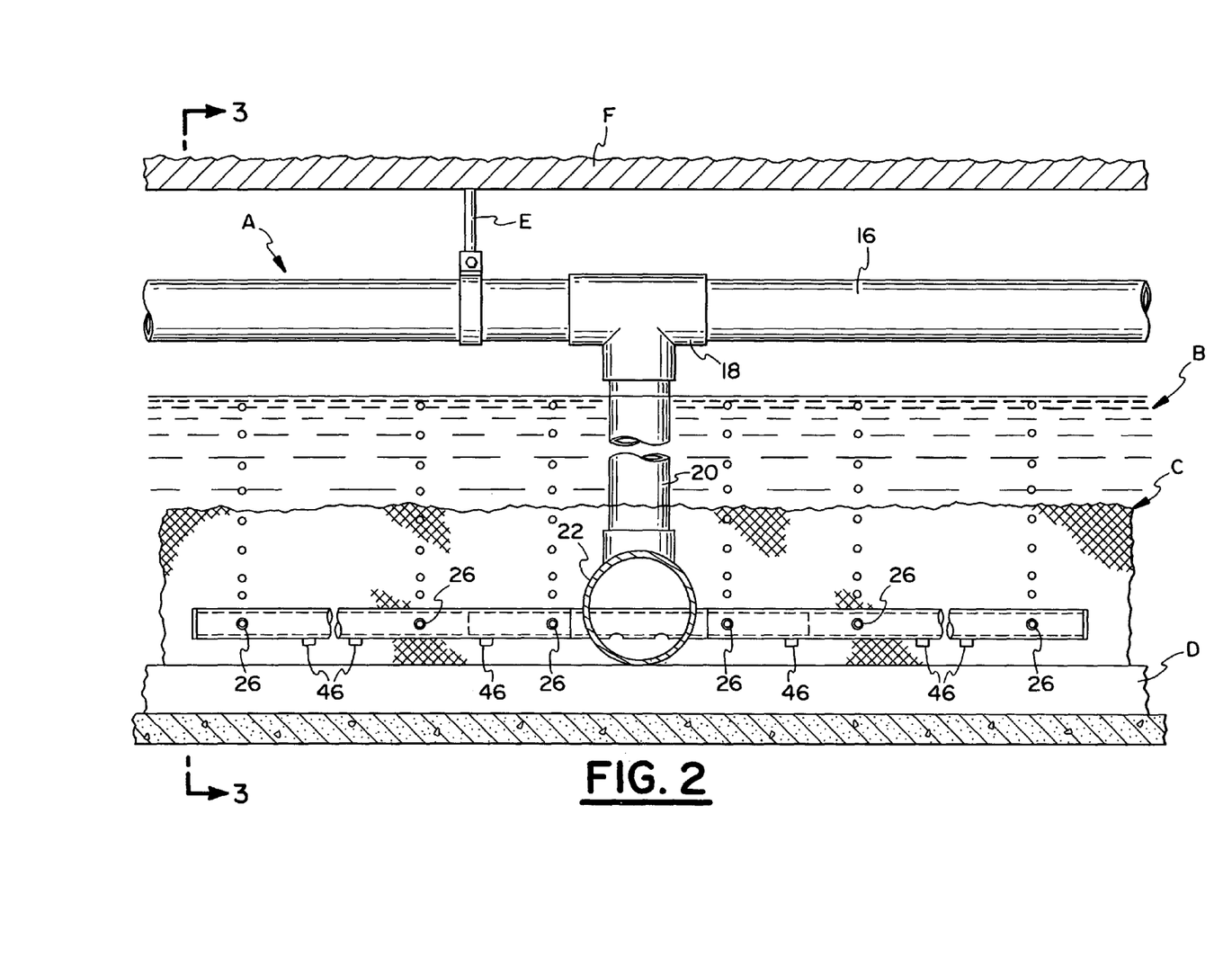
FIG. 2 is a side view of a preferred embodiment of the present invention with the fluid grid system employed in a filter system.

Referring to FIG. 2, a portion of a fluid grid system A is illustrated in one of many possible configurations. The fluid grid system as illustrated in the preferred environment is disposed in a filter bed B having a layer of media C and an underdrain D. While the fluid grid system A will typically be used to effect air scouring of a filter bed, it will be readily appreciated that the fluid grid system A can be mounted in any number of different types of fluid handling systems. The filter bed B can be formed of a single layer or multiple layers of media. The underdrain C can be of any conventional construction.

Preferably, a pipe hanger E supports the fluid grid system A from structure F. However, it will be readily understood that fluid grid system A may be supported from the sides or from the bottom or in any manner that is desirable.

Figure 3:
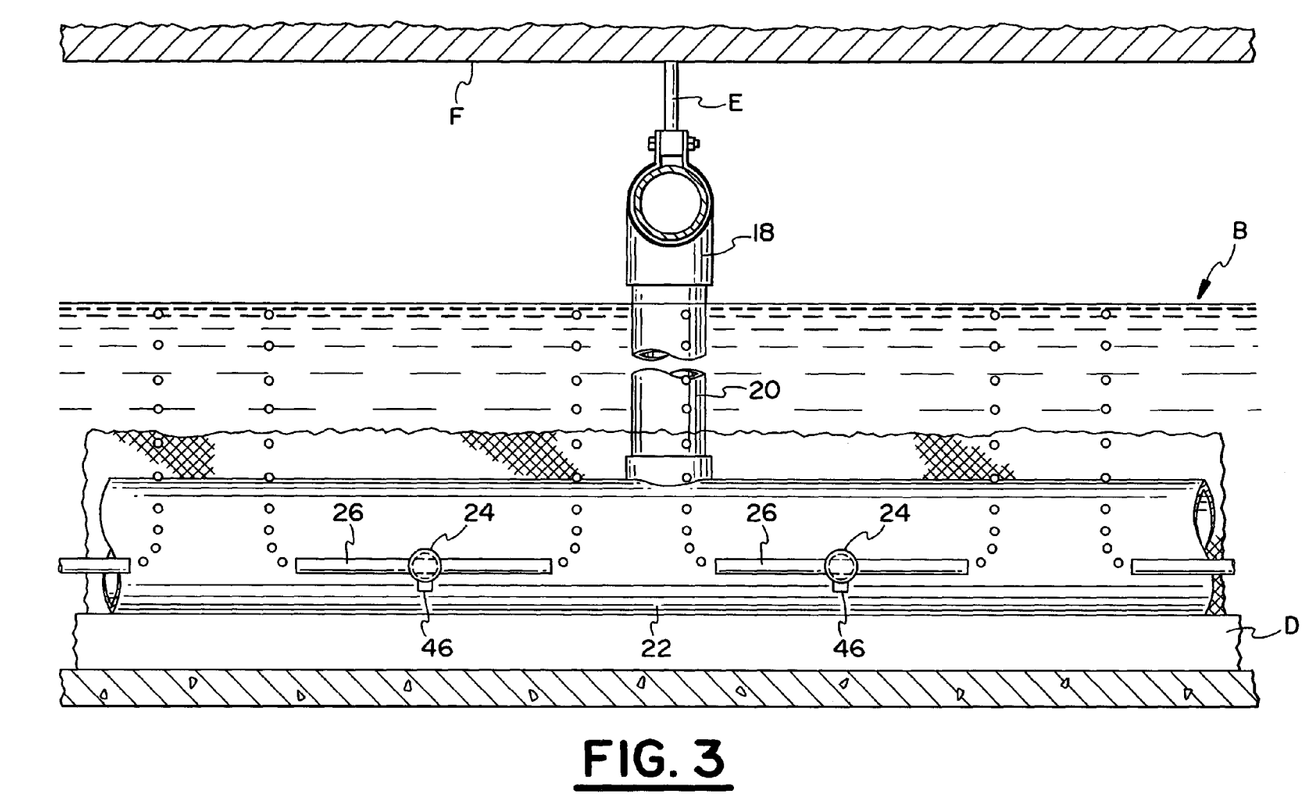
FIG. 3 is a sectional view of FIG. 2 taken along lines 3—3.

Referring to FIGS. 2 and 3, the fluid grid system A preferably includes a supply header 16, connecting piping 18 and 20, at least one main distribution header 22 and a plurality of laterals 24 extending outwardly from header 22.

As seen in FIGS. 2 through 5, a plurality of fluid diffuser conduits 26 extend outwardly from each of the laterals 24. Preferably, the fluid diffuser conduits 26 are identical in configuration regardless of the point at which the fluid diffuser conduit 26 is connected to lateral 24 and preferably takes the form depicted in FIGS. 6 and 7.

Figure 6:
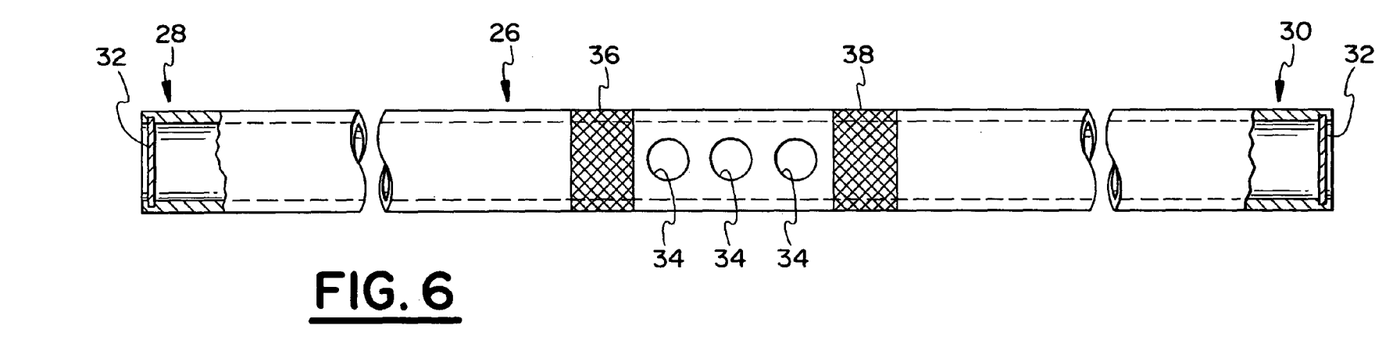
FIG. 6 is a plan view of the preferred form of fluid diffuser conduit with portions broken away. Numerous other configurations may be employed within the scope of the invention.
Figure 7:
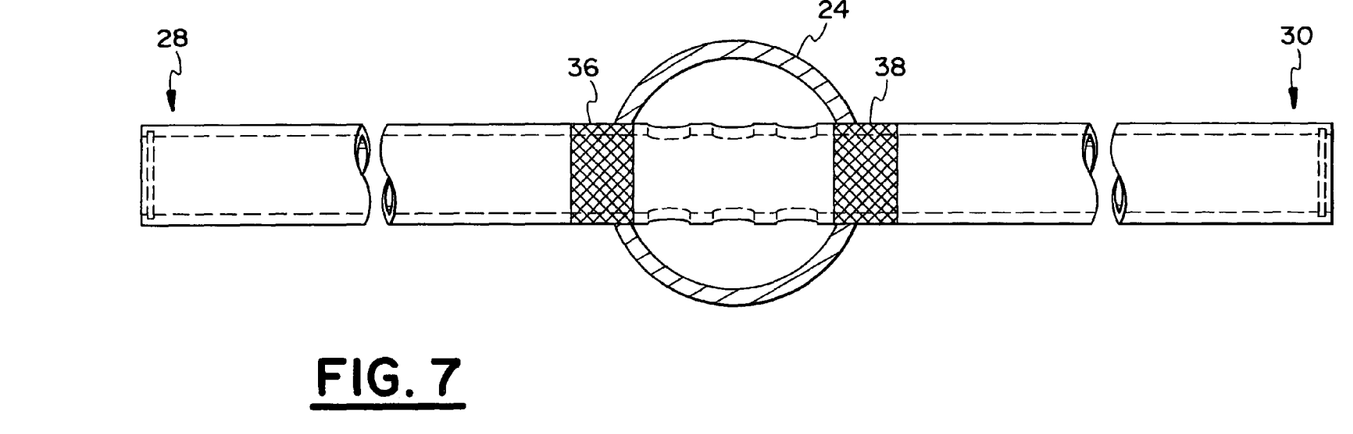
FIG. 7 is a side view of a preferred form of the fluid diffuser conduit positioned in a lateral. Numerous other configurations may be employed within the scope of the invention.

Referring to FIGS. 6 and 7, conduit 26 has a first end 28 and a second end 30. Screens 32 are formed in each of the ends 28 and 30. Screens 32 prevent the ends 28 and 30 of the conduit 26 from becoming obstructed by particulate matter while allowing fluid to escape from the conduit 26. Three openings 34 are formed in the middle of the conduit 26. Openings 34 allow fluid to be directed from the lateral 24 into the conduits 26. Conduit 26 further includes knurled sections 36 and 38 located on opposite sides of the openings 34. Preferably, knurled sections 36 and 38 are spaced an equal distance from their respective ends 28 and 30.

The knurled sections 36 and 38 allow the conduit 26 to be removably secured to the laterals 24 solely by applying a sufficient force to one end of the conduit 26 with a mallet or other suitable tool to either install or remove the conduit 26 from its operative location on lateral 24. The knurled sections 36 and 38 act to grip the walls of the lateral 24 with sufficient force to prevent the diffuser conduits 26 from becoming dislodged during use but permit ready removal of the diffuser conduits 26 provided a sufficient force is applied to overcome the gripping force of the knurled sections 36 and 38. Therefore, no clips or other fasteners are needed to secure or remove the conduits 26 from the laterals 24. Further, multiple conduits 26 can be removed simultaneously by placing a piece of wood or other material in contact with the ends of two or more diffuser conduits 26 and subsequently striking the piece of wood with a mallet or other suitable tool.

Figure 4:
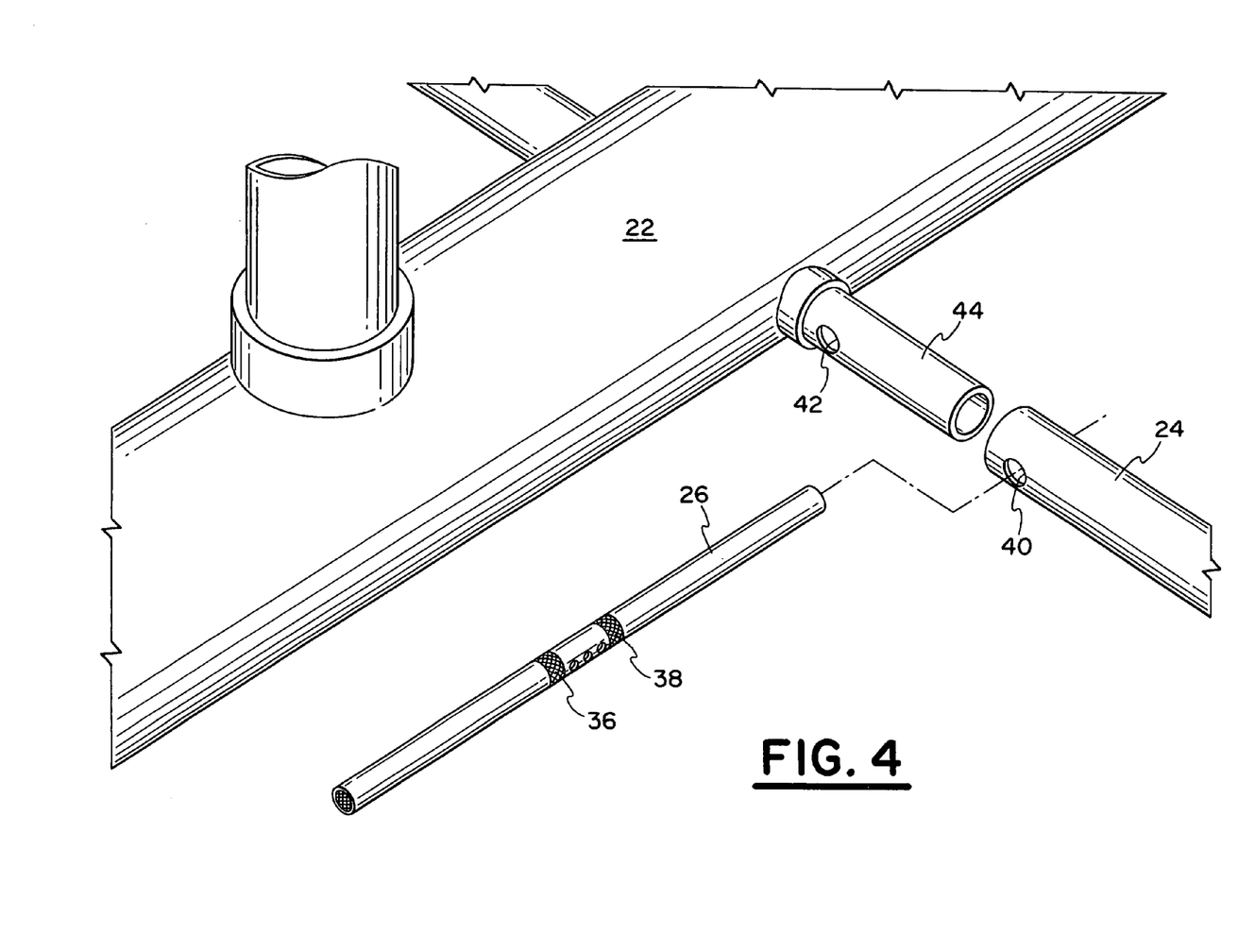
FIG. 4 is a fragmentary perspective view of a portion of the preferred form of the fluid grid system. Numerous other configurations may be employed within the scope of the invention.
Figure 5:
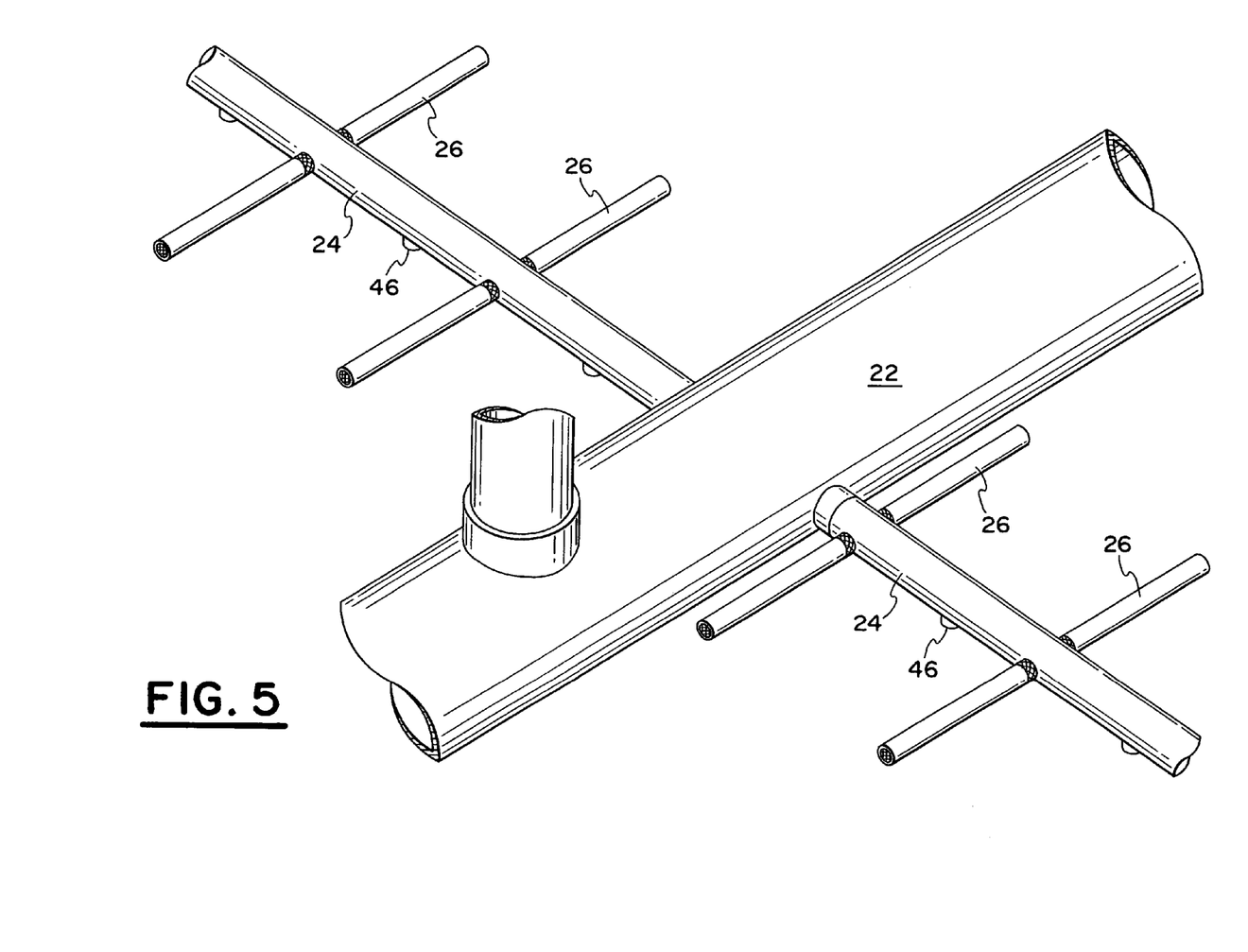
FIG. 5 is another fragmentary perspective view of a portion of the preferred form of the fluid grid system. Numerous other configurations may be employed within the scope of the invention.

Similarly, as seen in FIG. 4, the lateral 24 can be removably secured to the header 22 by aligning openings 40 (only one of which is shown) formed in the ends of the lateral 24 with the openings 42 (only one of which is shown) formed in the sleeve 44 and merely inserting the conduit 26 through these openings such that the knurled sections 36 and 38 engage and grip the walls of the lateral 24 and the walls of sleeve 44. It will be readily appreciated that the knurled sections 36 and 38 may be configured such that they are disposed entirely within lateral 24 when the conduit 26 is installed to prevent organisms from becoming lodged in these sections. It will also be appreciated that the openings 40 and 42 may be knurled rather than or in addition to conduit 26. Moreover, connecting devices other than knurling may be used.

Figure 8:
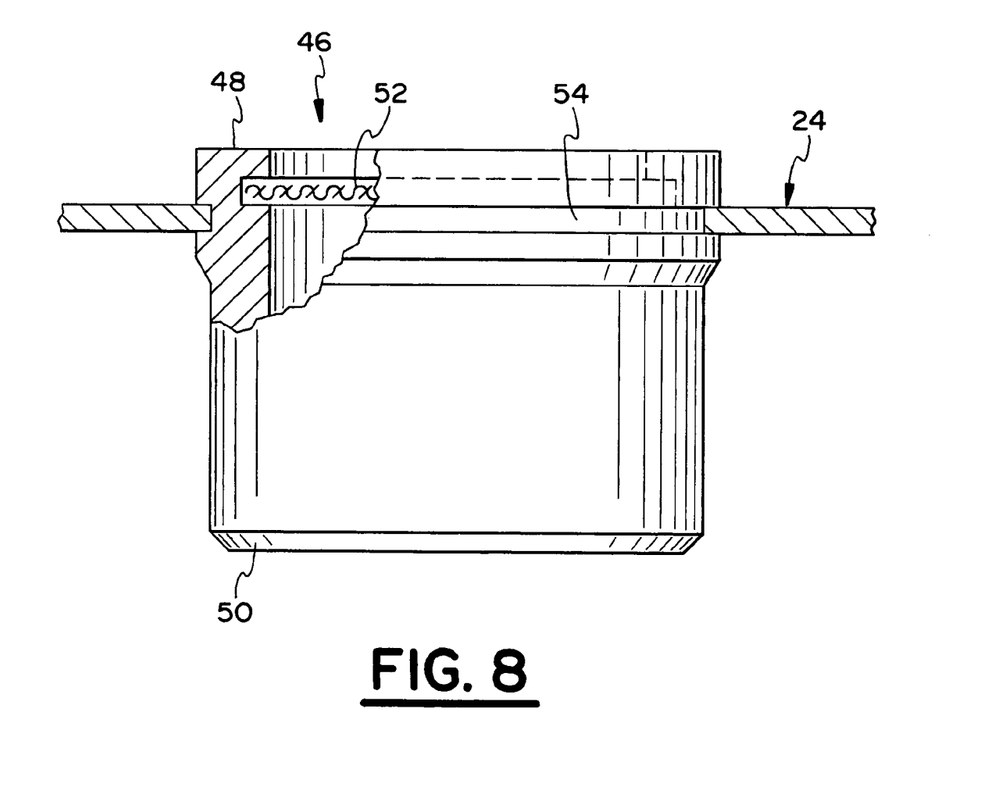
FIG. 8 is a side view of a preferred form of a fluid diffuser nozzle with a portion broken away. Numerous other configurations may be employed within the scope of the invention.

Referring to FIGS. 2, 3, 5 and 8, fluid diffuser nozzles 46 are disposed in the laterals 24 in between the fluid diffuser conduits 26. Referring to FIG. 8, nozzles 46 include a first end 48 and a second end 50. The first end 48 has a screen 52 formed therein to permit the escape of fluid while preventing the first end 48 from being obstructed by particulate matter. Second end 50 is disposed in the lateral 24 and has an opening formed therein to allow fluid to pass from the lateral 24 into the nozzle 46 where it escapes and enters the filter bed B. A recess 54 is formed around the outer surface of the nozzle 46 adjacent the first end 48. This recess permits the nozzle 46 to be readily installed in the lateral 24. As seen in FIG. 8, the walls of the lateral 24 are received in the recess 54.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A fluid grid system for distributing fluid through a filter bed, said fluid grid system comprising:
   (a) at least one header and at least one lateral, said lateral being connected to said header such that at least a portion of fluid passing through said header is directed to said lateral;
   (b) at least one fluid diffuser conduit for distributing fluid through a filter bed, said fluid diffuser conduit being connected to said lateral such that at least a portion of fluid passing through said lateral is directed to said fluid diffuser conduit; and,
   (c) a connecting section for removably connecting said fluid diffuser conduit to said lateral without using a clip, said connecting section including a knurled portion.

2. A fluid grid system as set forth in claim 1, wherein:
   (a) said knurled portion is formed in and outer surface of said fluid diffuser conduit.

3. A fluid grid system as set forth in claim 2, wherein:
   (a) said fluid diffuser conduit has first and second ends, said knurled portion is disposed between said first and second ends.

4. A fluid grid system as set forth in claim 3, wherein:
   (a) said knurled portion is disposed an equal distance from said first end and said second end.

5. A fluid grid system as set forth in claim 1, further including:
   (a) a plurality of fluid diffuser conduits being connected to said lateral such that at least a portion of a fluid passing through said lateral is directed to said plurality of fluid diffuser conduits; and,
   (b) a plurality of connecting sections for removably connecting said plurality of fluid diffuser conduits to said lateral without using a clip.

6. A fluid grid system for distributing fluid through a filter bed, said fluid grid system comprising:
   (a) a header and a lateral, said lateral being connected to said header such that at least a portion of fluid passing through said header is directed to said lateral;
   (b) at least one fluid diffuser conduit for distributing fluid through a filter bed, said fluid diffuser conduit being connected to said lateral such that at least a portion of fluid passing through said lateral is directed to said fluid diffuser conduit; and,
   (c) said fluid diffuser conduit having a knurled portion for removably connecting said fluid diffuser conduit to said lateral without using a clip.

7. A fluid grid system as set forth in claim 6, wherein:
   (a) said fluid diffuser conduit has first and second ends, said knurled portion is disposed between said first and second ends.

8. A fluid grid system for distributing fluid through a filter bed, said fluid grid system comprising:
   (a) a header and a lateral, said lateral being connected to said header such that at least a portion of fluid passing through said header is directed to said lateral;
   (b) first and second fluid diffuser conduits for distributing a fluid through a filter bed, said first and second fluid diffuser conduits being connected to said lateral such that at least a portion of a fluid passing through said lateral is directed to said first and second fluid diffuser conduits; and,
   (c) first and second connecting sections for removably connecting said first and second fluid diffuser conduits to said lateral, said first connecting section being a knurled portion of an outer surface of said first fluid diffuser conduit and said second connecting section being a knurled portion of an outer surface of said second fluid diffuser conduit.

9. A method of assembling a fluid grid system for distributing fluid, said method comprising the steps of:
   (a) providing at least one header and at least one lateral;
   (b) providing at least one fluid diffuser conduit, said at least one fluid diffuser conduit having a knurled portion; and (c) removably connecting said fluid diffuser conduit to said lateral such that said fluid diffuser conduit can be removed from said lateral solely by applying a force to a portion of said fluid diffuser conduit.

10. The method as set forth in claim 9, further including the steps of:
   (a) providing a plurality of fluid diffuser conduits, each of said plurality of fluid diffuser conduits include a knurled portion;
   (b) removably connecting said plurality of fluid diffuser conduits to said lateral such that each of said plurality of fluid diffuser conduits can be removed from said lateral solely by applying a force to each of said fluid diffuser conduits.

11. A filter system comprising:
   (a) a filter bed;
   (b) a fluid grid system operably associated with said filter bed such that fluid passing through said fluid grid system is directed through said filter bed;
   (c) said fluid grid system includes at least one header, at least one lateral and at least one fluid diffuser conduit, said header being connected to said lateral such that at least a portion of a fluid passing through said header is directed to said lateral, said fluid diffuser conduit being connected to said lateral such that at least a portion of a fluid passing through said lateral is directed to said fluid diffuser conduit;
   (d) a connecting section for connecting said fluid diffuser conduit to said lateral such that said fluid diffuser conduit can be removed from said lateral solely by applying a force to a portion of said fluid diffuser conduit, said connecting section including a knurled portion.

12. A filter system as set forth in claim 11, wherein:
   (a) said knurled portion is formed on an outer surface of said fluid diffuser conduit.

* * * * *